United States Patent
Higuchi (10) Patent No.: US 8,373,775 B2
(45) Date of Patent: Feb. 12, 2013

(54) APPARATUS, METHOD AND SOFTWARE STORED ON A COMPUTER-READABLE STORAGE MEDIUM, FOR REDUCING NOISE IN AN IMAGE

(75) Inventor: Masayu Higuchi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 12/579,548

(22) Filed: Oct. 15, 2009

(65) Prior Publication Data

US 2010/0110235 A1 May 6, 2010

(30) Foreign Application Priority Data

Oct. 31, 2008 (JP) .................. 2008-281359

(51) Int. Cl.
*H04N 5/217* (2006.01)
(52) U.S. Cl. ..................... 348/241; 348/222.1
(58) Field of Classification Search ............... 348/222.1, 348/241, 252
See application file for complete search history.

(56) References Cited

U.S. PATENT DOCUMENTS

| | | |
|---|---|---|
| 5,956,432 A | 9/1999 | Ohta |
| 8,189,941 B2 | 5/2012 | Miyasaka |
| 2006/0233456 A1* | 10/2006 | Ahn et al. ............... 382/275 |
| 2008/0049239 A1 | 2/2008 | Chiaki et al. |
| 2008/0239355 A1* | 10/2008 | Goto et al. .............. 358/1.9 |
| 2008/0252789 A1* | 10/2008 | Sawa ....................... 348/607 |
| 2009/0273717 A1* | 11/2009 | Masaoka et al. ......... 348/620 |

FOREIGN PATENT DOCUMENTS

| | | |
|---|---|---|
| JP | 08-065673 A | 5/1996 |
| JP | 09-050519 A | 2/1997 |
| JP | 2005-142891 A | 6/2005 |
| JP | 2005-267119 A | 9/2005 |
| JP | 2006-094419 A | 4/2006 |
| JP | 2006-311501 A | 11/2006 |
| JP | 2007-034676 A | 2/2007 |
| JP | 2007-181189 A | 6/2007 |
| JP | 2008-051833 A | 5/2008 |

OTHER PUBLICATIONS

Office Action established for JP 2008-281359 (Sep. 11, 2012).

* cited by examiner

*Primary Examiner* — Gevell Selby
(74) *Attorney, Agent, or Firm* — Drinker Biddle & Reath LLP (57) ABSTRACT

An apparatus, method, and software stored on a computer-readable storage medium, for correctly reduce noise included in image data regardless of the characteristics of the image data. The noise reduction apparatus and method employ a determinator for determining whether a target pixel of image data corresponds to a flat portion, an edge portion, or a gradation portion based on a pixel value of the target pixel and pixel values of neighboring pixels of the target pixel; and a noise reduction unit for reducing noise included in the image data based on a result of the determining by the determinator.

22 Claims, 7 Drawing Sheets

| | CLASSIFICATION | CHARACTERISTIC COEFFICIENT | | NR SELECTION |
|---|---|---|---|---|
| | | K1 | K2 | |
| 1 | FLAT PORTION | VALUE < TH | VALUE < TH | WEAK LPF |
| 2 | GRADATION PORTION | VALUE > TH | VALUE < TH | STRONG LPF |
| 3 | FREQUENCY REPETITION PATTERN | VALUE < TH | VALUE > TH | DIRECTIONAL LPF |
| 4 | EDGE PORTION | VALUE > TH | VALUE > TH | DIRECTIONAL LPF |

FIG. 7

| 1 | 4 | 6 | 4 | 1 |
|---|---|---|---|---|
| 4 | 16 | 24 | 16 | 4 |
| 6 | 24 | 36 | 24 | 6 |
| 4 | 16 | 24 | 16 | 4 |
| 1 | 4 | 6 | 4 | 1 |

FIG. 8

| 0 | 0 | 0 | 0 | 0 |
|---|---|---|---|---|
| 0 | 1 | 2 | 1 | 0 |
| 0 | 2 | 4 | 2 | 0 |
| 0 | 1 | 2 | 1 | 0 |
| 0 | 0 | 0 | 0 | 0 |

APPARATUS, METHOD AND SOFTWARE STORED ON A COMPUTER-READABLE STORAGE MEDIUM, FOR REDUCING NOISE IN AN IMAGE

CROSS-REFERENCE TO RELATED PATENT APPLICATION

This application claims the benefit of Japanese Patent Application No. 2008-281359, filed on Oct. 31, 2008, in the Japanese Intellectual Property Office, the entire contents of which are incorporated herein by reference.

BACKGROUND OF THE INVENTION

1. Field of the Invention

The present invention relates to an apparatus and method for reducing noise in an image, and a computer-readable storage medium storing software for reducing noise in an image.

2. Description of the Related Art

In photographing apparatuses such as a digital still camera and a video camera, noise is typically present in image data that is generated based on an electrical signal output from an imaging device which converts optical data into an electrical signal. Such noise can thus deteriorate the image. Thus, in some cases, the image data is filtered in order to reduce noise.

For example, Japanese Patent Publication No. 2006-311501 (the '501 publication) and Japanese Patent Publication No. 2005-142891 (the '891 publication) disclose technologies for reducing noise of image data. In the device described in the '501 publication, an average pixel value of a plurality of neighboring pixels that are symmetrically disposed about a target pixel of image data is restricted to a predetermined range, and low-pass-filtering is performed on the target pixel when the restricted pixel value of the neighboring pixels is set as a new pixel value. In the device described in the '891 publication, at least one value representing a degree of flatness or a degree of gradation is calculated in each pixel. The calculated value functions as a coefficient for performing planarization filtering on a pixel if the calculated value represents a flat portion, functions as a coefficient for performing edge enhancement filtering on a pixel if the calculated value represents a gradation portion, and functions as a coefficient for variably performing planarization filtering and edge enhancement filtering on a pixel if the calculated value represents an intermediate portion.

In the device described in the '501 publication, noise reduction may be achieved regardless of whether a target pixel corresponds to an edge portion, a flat portion, or a gradation portion. However, signals in the edge portion are excessively reduced due to filtering. Also, since the flat portion and gradation portion are not identifiable from each other, a noise reduction strength optimized for the flat portion is insufficient for the gradation portion. On the other hand, a noise reduction strength optimized for the gradation portion is excessive for the flat portion.

In the device described in the '891 publication, a gradation portion is often misrecognized as an edge portion. In this case, noise of the gradation portion is increased. Also, when the gradation portion is misrecognized as a flat portion, a noise reduction strength optimized for the flat portion is insufficient for the gradation portion. On the other hand, a noise reduction strength optimized for the gradation portion is excessive for the flat portion.

SUMMARY OF THE INVENTION

The present invention provides a new and improved apparatus and method for reducing noise in image data, and a computer-readable storage medium for storing software for reducing noise in image data, so as to correctly reduce noise included in the image data regardless of the characteristics of the image data.

Accordingly, an embodiment of the present invention provides a noise reduction apparatus including a determinator for determining whether a target pixel of image data corresponds to a flat portion, an edge portion, or a gradation portion based on a pixel value of the target pixel and pixel values of neighboring pixels of the target pixel; and a noise reduction unit for reducing noise included in the image data based on a result of the determining by the determinator. The determinator may calculate at least one characteristic coefficient representing characteristics of the neighboring pixels by using the pixel value of the target pixel and the pixel values of the neighboring pixels, and may determine whether the target pixel corresponds to the flat portion, the edge portion, or the gradation portion based on the at least one characteristic coefficient.

The at least one characteristic coefficient may be obtained by linearly combining absolute values of coefficients representing spatial frequency components of the neighboring pixels, and the determinator may determine whether the target pixel corresponds to the flat portion, the edge portion, or the gradation portion based on size relationship of a plurality of characteristic coefficients. The noise reduction unit may include a plurality of noise reduction units, and at least one of the plurality of noise reduction units may be selected based on the result of the determining by the determinator. Thus, the noise included in the image data may be reduced by applying the selected at least one noise reduction unit to the target pixel. The noise reduction unit to be applied when it is determined that the target pixel corresponds to the gradation portion may have a noise reduction strength greater than that of the noise reduction unit to be applied to when it is determined that the target pixel corresponds to the flat portion.

Another embodiment of the present invention provides a noise reduction method including calculating at least one characteristic coefficient representing characteristics of neighboring pixels of a target pixel of image data by using a pixel value of the target pixel and pixel values of the neighboring pixels; determining whether the target pixel corresponds to a flat portion, an edge portion, or a gradation portion based on the at least one characteristic coefficient; and reducing noise included in the image data based on a result of the determining operation.

A further embodiment of the present invention provides a computer-readable storage medium for storing a computer program including codes programmed to calculate at least one characteristic coefficient representing characteristics of neighboring pixels of a target pixel of image data by using a pixel value of the target pixel and pixel values of the neighboring pixels; codes programmed to determine whether the target pixel corresponds to a flat portion, an edge portion, or a gradation portion based on the at least one characteristic coefficient; and codes programmed to reduce noise included in the image data based on a result of the determining process.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described in detail by explaining embodiments of the invention with reference to the attached drawings. Like reference numerals denote like elements in the drawings.

Figure 1:
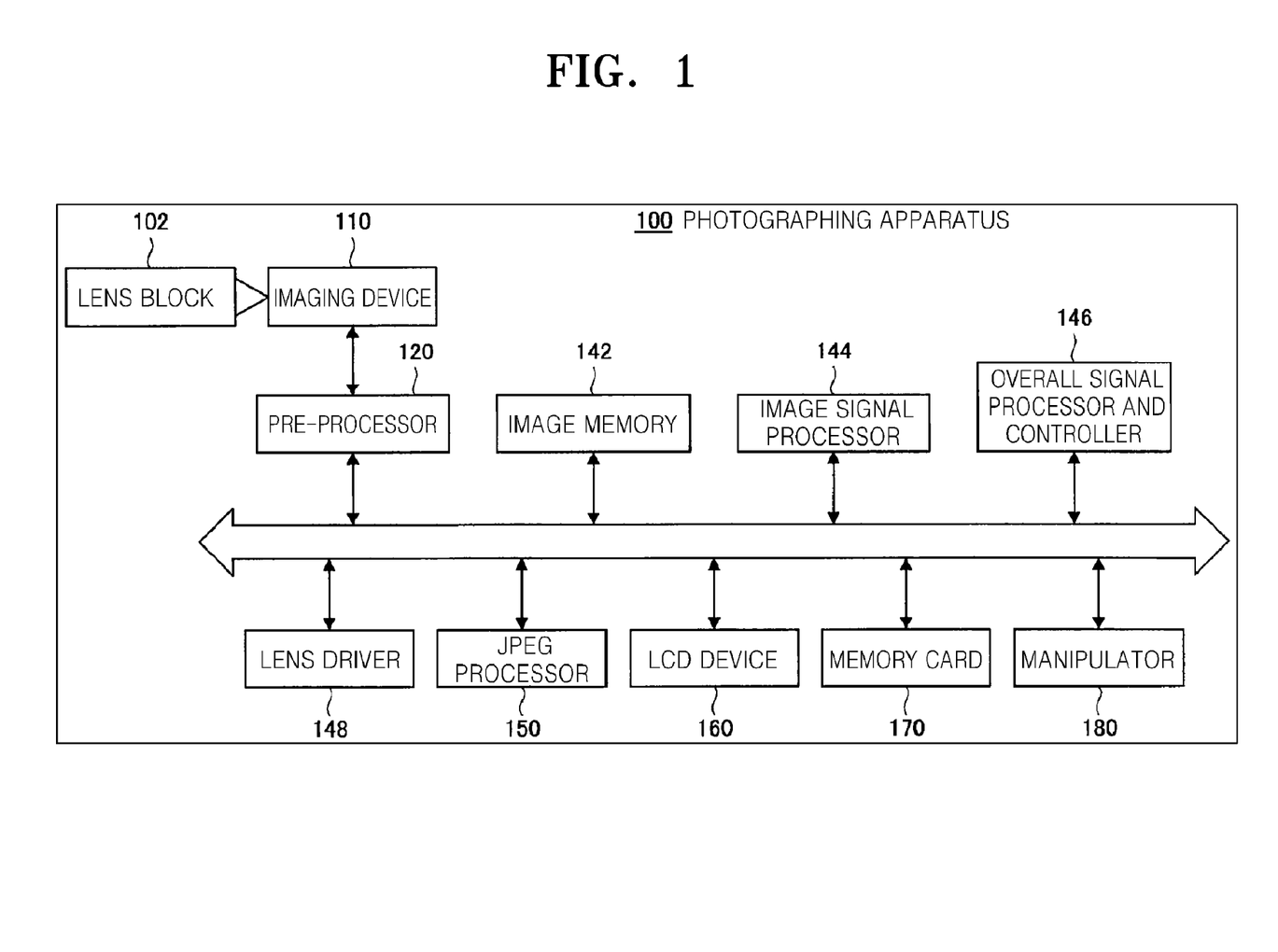
FIG. 1 is a block diagram of an example of a photographing apparatus according to an embodiment of the present invention.

FIG. 1 is a block diagram of a photographing apparatus 100 according to an embodiment of the present invention. The photographing apparatus 100 may include a lens block 102, an imaging device 110, a pre-processor 120, an image memory 142, an image signal processor 144, an overall signal processor and controller 146, a lens driver 148, a Joint Photographic Experts Group (JPEG) processor 150, a liquid crystal display (LCD) device 160, a memory card 170, and a manipulator 180.

The lens block 102 may include a zoom lens (not shown), an iris (not shown), and a focus lens (not shown). The lens block 102 in this example is an optical system that forms an image on the imaging device 110 by using external optical data, and transmits light from a subject to the imaging device 110. The zoom lens varies a viewing angle according to a focal length. The iris in this example is a tool that controls the intensity of incident light. The focus lens moves in an optical axis direction so as to auto-focus an image of the subject on an imaging surface of the imaging device 110, and is driven by the lens driver 148.

The imaging device 110 is an example of a photoelectric conversion device, and includes a plurality of photoelectric conversion elements capable of converting data of light incident through the lens block 102 into an electrical signal. Each photoelectric conversion element generates an electrical signal according to the intensity of received light. The imaging device 110 may be a charge-coupled device (CCD) sensor or a complementary metal-oxide semiconductor (CMOS) sensor.

Also, a mechanical shutter (not shown) or an electronic shutter (not shown) may be used to block light in a non-photographing mode and to receive light only in a photographing mode so that an exposure time of the imaging device 110 is controlled. The mechanical shutter or the electronic shutter may be driven by pressing a shutter button of the manipulator 180 connected to the overall signal processor and controller 146.

The imaging device 110 includes a correlated double sampling (CDS)/amplifier (AMP) unit (not shown) and an analog/digital (A/D) conversion unit (not shown). The CDS/AMP unit removes low-frequency noise included in the electrical signal output from the imaging device 110 and amplifies the electrical signal to a certain level. The A/D conversion unit performs digital conversion on the electrical signal output from the CDS/AMP unit so as to generate a digital signal, and outputs the digital signal to the pre-processor 120.

The pre-processor 120 pre-processes the digital signal output from the A/D conversion unit so as to generate an image signal on which image processing may be performed. The pre-processor 120 may perform pixel defect correction, black level correction, shading correction, and calculation of auto-focus (AF) evaluation value on the digital signal output from the imaging device 110. The pre-processor 120 may output the image signal to the image signal processor 144. Also, the pre-processor 120 controls reading and writing operations of image data from and to the image memory 142.

The image memory 142 may be synchronous dynamic random access memory (SDRAM) and temporarily stores image data of a captured image. The image memory 142 has a memory capacity for storing image data of a plurality of images. The reading and writing operations from and to the image memory 142 are controlled by the pre-processor 120.

The image signal processor 144 receives the image signal from the pre-processor 120 and converts the image signal into a luminance signal and a color signal. The image signal processor 144 includes a noise reduction unit 130 (see FIG. 2) and performs noise reduction. Also, the image signal processor 144 generates an image-processed image signal based on a white balance control value, a gamma value, an edge enhancement control value, etc. The image signal processor 144 outputs the image signal to the overall signal processor and controller 146.

The overall signal processor and controller 146 functions as an operation processing device and a control device by using a program so as to control operations of the other components included in the photographing apparatus 100. The overall signal processor and controller 146 may output a signal to the lens driver 148 so as to drive the focus lens of the lens block 102. Also, the overall signal processor and controller 146 controls the other components of the photographing apparatus 100 based on signals received from the manipulator 180. In FIG. 1, the overall signal processor and controller 146 is realized as a single component but may also be realized as a plurality of physical components. For example, instructions of a signal system and instructions of a manipulation system may be separately executed by using different central processor units (CPUs).

When a manipulation signal for starting focus control is received, the lens driver 148 generates a control signal for moving the focus lens in one direction and outputs the control signal to the lens block 102. The lens driver 148 calculates an AF location of the focus lens based on the AF evaluation value that is calculated by the pre-processor 120 based on the luminance value of the image signal. The AF evaluation value may be, for example, a contrast value of an image and it is determined that an image of a subject is auto-focused on the imaging surface of the imaging device 110 when the contrast value is a maximum (a contrast detection method). In this embodiment, the focus control is not limited to the contrast detection method and may also be performed by using another method.

The JPEG processor 150 compresses and encodes image data received from the overall signal processor and controller 146 by using, for example, a still image encoding method in a JPEG format. Also, the JPEG processor 150 decompresses and decodes encoded data received from the memory card 170.

The LCD device 160 receives image data from, for example, video random access memory (VRAM) and displays an image on a screen. The LCD device 160 may be included in a main body of the photographing apparatus 100. The image displayed by the LCD device 160 is, for example, an image that is read from the VRAM and has not yet been captured (a live view image), various setting screen images of the photographing apparatus 100, or a captured and stored image. In FIG. 1, the LCD device 160 is used as a display unit but the display unit is not limited to the LCD device 160. For example, an organic electroluminescent (EL) display unit may also be used.

The VRAM is memory for displaying images and may have a plurality of channels. The VRAM may receive image data for displaying an image from the image memory 142 and may output the image data to the LCD device 160 at the same time. A resolution or a maximum number of colors of the LCD device 160 depends on the capacity of the VRAM.

The memory card 170 is used to write image data, to read written image data, or to read setting information. The memory card 170 may be a recording medium such as a magnetic disk or a semiconductor memory medium, and records captured image data. The recording medium is not limited to the memory card 170 and may also be a magneto-optical disk or an optical disk such as a compact disk (CD), a digital versatile disk (DVD), or a Blu-ray disk. Also, the memory card 170 may be removable from the photographing apparatus 100.

The manipulator 180 may be, for example, a direction key, a power switch, a mode dial, or a shutter button installed on the photographing apparatus 100. The manipulator 180 transmits a manipulation signal based on a user's manipulation to the overall signal processor and controller 146. For example, the shutter button may be half-pressed (manipulation S1), full-pressed (manipulation S2), or released by the user. A focus control start manipulation signal is output when the shutter button is half-pressed and then focus control is terminated when the shutter button is released. Also, a photographing start manipulation signal is output when the shutter button is full-pressed.

The series of processes in the photographing apparatus 100 may be performed by using hardware or software such as a computer program.

Figure 2:
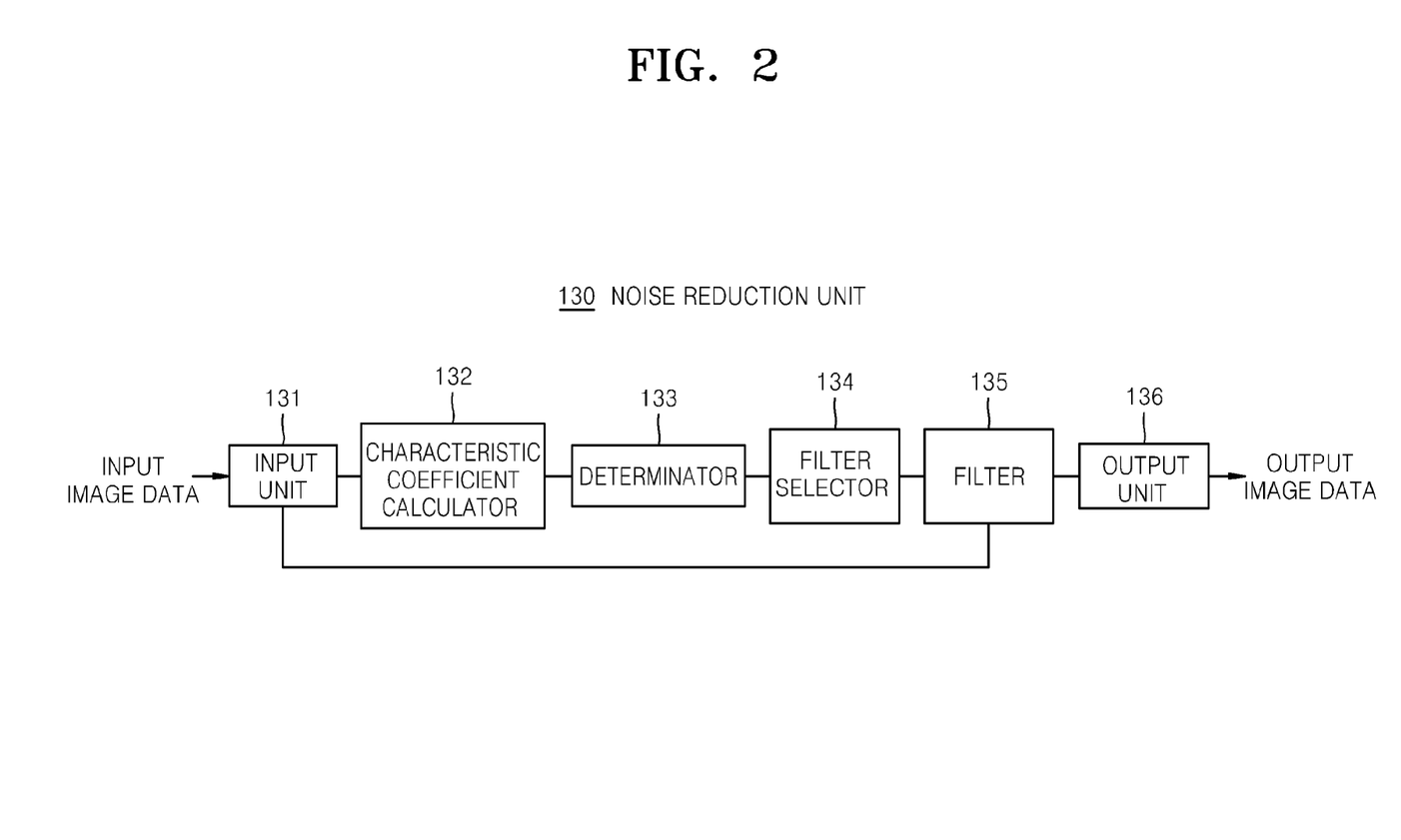
FIG. 2 is a block diagram of an example of a noise reduction unit according to an embodiment of the present invention.

FIG. 2 is a block diagram of an example of the noise reduction unit 130 according to an embodiment of the present invention. The noise reduction unit 130 is an example of a noise reduction apparatus and may be included in the image signal processor 144 illustrated in FIG. 1. The noise reduction unit 130 may include an input unit 131, a characteristic coefficient calculator 132, a determinator 133, a filter selector 134, a plurality of filters 135, and an output unit 136.

The input unit 131 receives image data Y1 formed of a luminance signal that is generated when image data output from the imaging device 110 illustrated in FIG. 1 is converted into a luminance signal and a color signal. The received image data Y1 is transmitted to the characteristic coefficient calculator 132.

The characteristic coefficient calculator 132 calculates at least one characteristic coefficient representing the characteristics of neighboring pixels of a target pixel of the image data Y1 by using a pixel value of the target pixel and pixel values of the neighboring pixels. The characteristic coefficient may be obtained by linearly combining absolute values of coefficients representing spatial frequency components of the neighboring pixels.

The determinator 133 determines whether the target pixel corresponds to a flat portion, an edge portion, or a gradation portion based on the characteristic coefficient calculated by the characteristic coefficient calculator 132. For example, the determinator 133 determines whether the target pixel corresponds to the flat portion, the edge portion, or the gradation portion based on size relationship of a plurality of characteristic coefficients. The flat portion is a portion where pixel values of neighboring pixels are the same or almost the same, the edge portion is a portion where pixel values of neighboring pixels rapidly increase or decrease, and the gradation portion is a portion where pixel values of neighboring pixels gradually increase or decrease.

The filter selector 134 selects at least one of the filters 135 based on the determination result of the determinator 133. The selected filter 135 differs according to the image data Y1. The filter selector 134 transmits information regarding the selected filter 135 to the filters 135.

According to this embodiment, the filters 135 may be recorded in a memory unit. The filter selector 134 selects at least one of the filters 135 according to the image data Y1 and the selected filter 135 reduces noise included in the image data Y1. The selected filter 135 receives the image data Y1 from the input unit 131, filters the target pixel of the image data Y1 so as to generate filtered image data Y2, and transmits the filtered image data Y2 to the output unit 136.

The output unit 136 outputs the filtered image data Y2 to outside the noise reduction unit 130. Then, for example, color interpolation, white balance correction, and gamma correction may be additionally performed on the output image data Y2.

The series of processes in the noise reduction unit 130 may be performed by using hardware or software such as a computer program.

Figure 3:
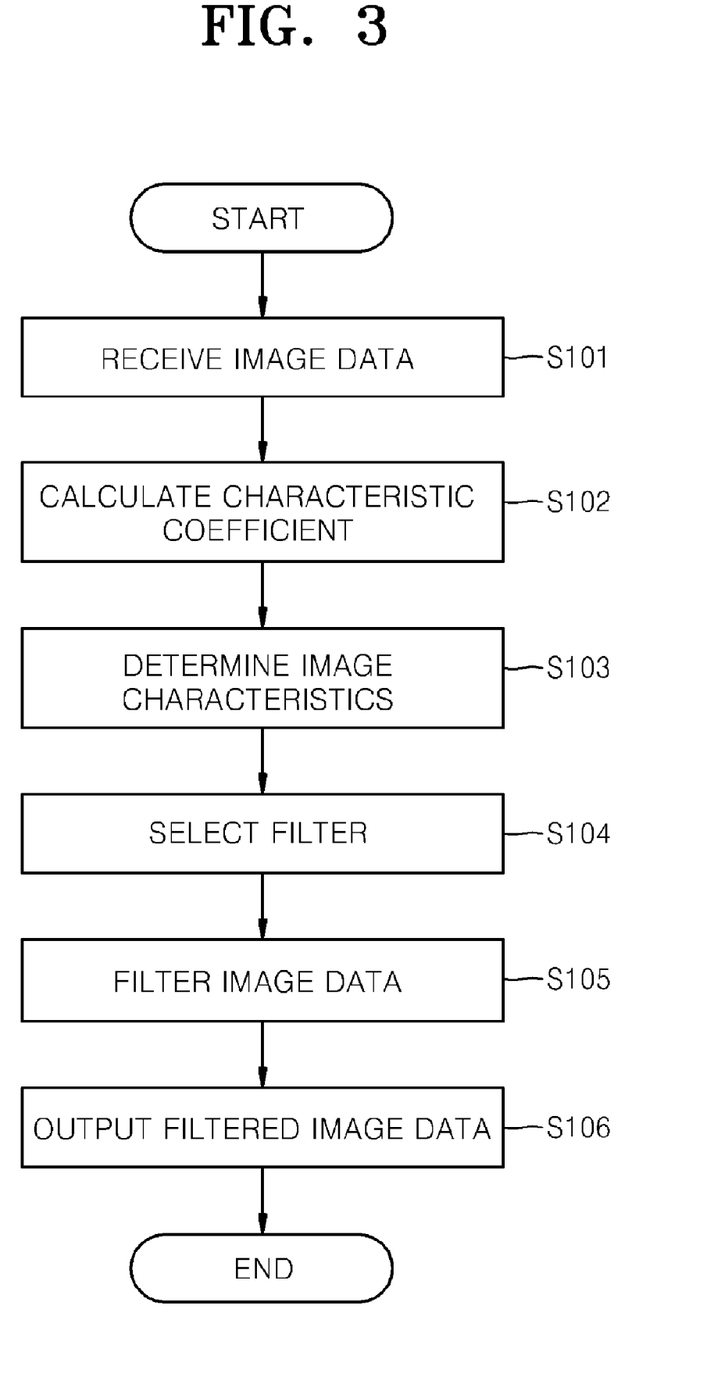
FIG. 3 is a flowchart for describing an example of an operation of the noise reduction unit illustrated in FIG. 2, according to an embodiment of the present invention.

FIG. 3 is a flowchart for describing an example of the operation of the noise reduction unit 130 illustrated in FIG. 2, according to an embodiment of the present invention. Referring to FIGS. 2 and 3, initially, the input unit 131 of the noise reduction unit 130 receives image data Y1 formed of a luminance signal (operation S101). Then, based on a pixel value of a target pixel of the image data Y1 and pixel values of neighboring pixels of the target pixel, the characteristic coefficient calculator 132 calculates at least one characteristic coefficient representing the characteristics of the neighboring pixels (operation S102).

Then, the determinator 133 determines whether the target pixel corresponds to a flat portion, an edge portion, or a gradation portion based on the characteristic coefficient (operation S103). Afterward, at least one of the filters 135 is selected based on whether the target pixel corresponds to the flat portion, the edge portion, or the gradation portion (operation S104). Then, the selected filter 135 filters the target pixel of the image data Y1 so as to generate filtered image data Y2 (operation S105). As such, noise included in the image data Y1 may be correctly reduced regardless of the characteristics of the image data Y1 (the flat portion, the edge portion, or the gradation portion). Lastly, the filtered image data Y2 is output to outside the noise reduction unit 130 (operation S106).

The characteristic coefficient calculated by the characteristic coefficient calculator 132 will now be described in detail.

The characteristic coefficient is calculated by performing two-dimensional (2D) discrete cosine transformation (DCT) on image data, calculating DCT coefficients (2D spatial frequency components), and summing absolute values of the calculated DCT coefficients. For example, a case when image data is divided into blocks of 5×5 pixels, as illustrated in FIG. 4, will now be described.

Figure 4:
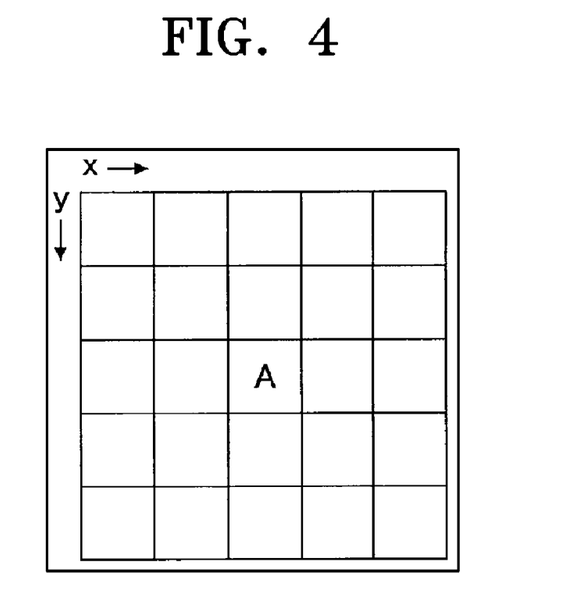
FIG. 4 is a diagram showing an example of the arrangement of pixels in image data.

FIG. 4 is a diagram showing an example of the arrangement of pixels in image data. As shown, a block of 5×5 pixels is extracted from the image data and A represents a target pixel. If it is assumed that a pixel value of each pixel is f(x,y), DCT coefficients F(u,v) of each block are as defined in Equation 1.

$$F(u, v) = \sum_{y=0}^{4}\sum_{x=0}^{4} f(x, y) \cdot \cos\left(v \cdot (2 \cdot x + 1) \cdot \frac{\pi}{10}\right) \cdot \cos\left(u \cdot (2 \cdot y + 1) \cdot \frac{\pi}{10}\right) \quad (1)$$

Figure 5:
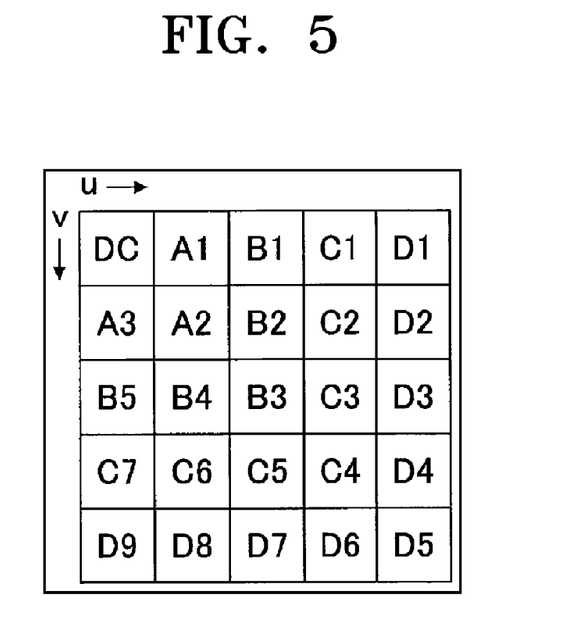
FIG. 5 is a diagram showing an example of the arrangement of discrete cosine transformation (DCT) coefficients.

As such, the DCT coefficients F(u,v) are arranged as illustrated in FIG. 5.

FIG. 5 is a diagram showing the arrangement of DCT coefficients. As shown in FIG. 5, a top left portion of each block represents a direct current (DC) component. A coefficient is allocated to each of the alternating current (AC) components. For example, coefficients are allocated as described below.

F(1,2)=A1, F(2,2)=A2, F(2,1)=A3,
F(1,3)=B1, F(2,3)=B2, F(3,3)=B3, F(3,2)=B4, F(3,1)=B5,
F(1,4)=C1, F(2,4)=C2, F(3,4)=C3, F(4,4)=C4, F(4,3)=C5, F(4,2)=C6, F(4,1)=C7, and
F(1,5)=D1, F(2,5)=D2, F(3,5)=D3, F(4,5)=D4, F(5,5)=D5, F(5,4)=D6, F(5,3)=D7, F(5,2)=D8, F(5,1)=D9.

Determination by the determinator 133 illustrated in FIG. 2 and filter selection by the filter selector 134 illustrated in FIG. 2 will now be described in detail.

The determinator 133 determines whether a target pixel corresponds to a flat portion, an edge portion, or a gradation portion based on a characteristic coefficient calculated by the characteristic coefficient calculator 132. Examples of the characteristic coefficient, i.e., characteristic coefficients k1 and k2 are calculated as shown in the following equations.

$$k1 = |A1| + |A2| + |A3|$$

$$k2 = |B1| + |B2| + |B3| + |B4| + |B5|$$

Initially, each of the characteristic coefficients k1 and k2 is compared to a predetermined threshold value.

Figure 6:
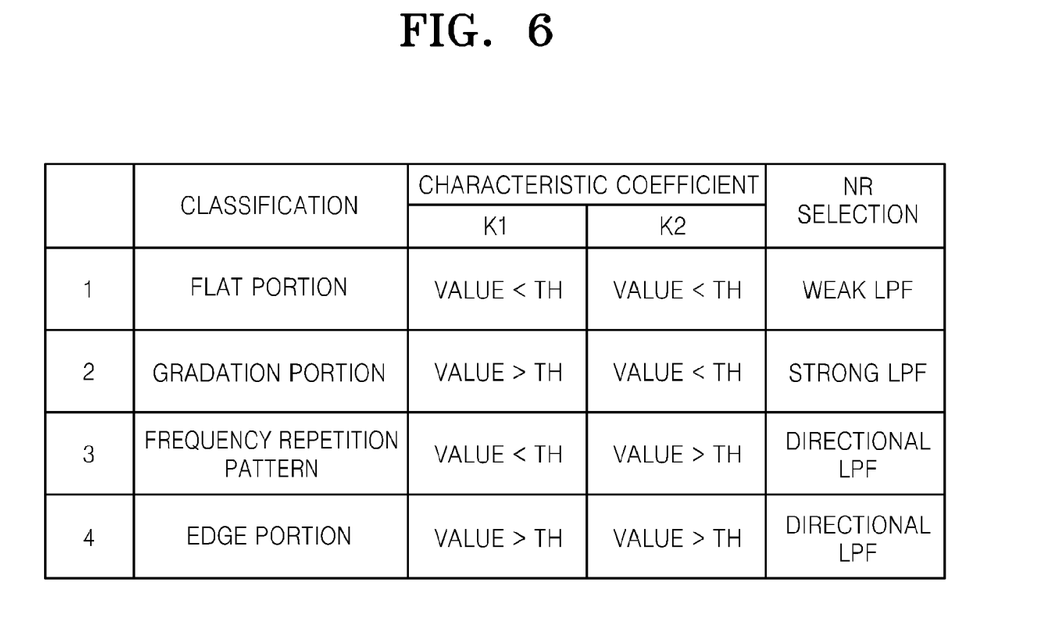
FIG. 6 is a table showing an example of correlations between size relationship of characteristic coefficients and image determination or filters.

Then, it is determined whether the target pixel corresponds to a flat portion, a gradation portion, a frequency repetition pattern, or an edge portion with reference to a table illustrated in FIG. 6 based on whether each of the characteristic coefficients k1 and k2 is greater or less than the predetermined threshold value. Then, a filter for reducing noise is selected based on the determination result. FIG. 6 is a table showing examples of correlations between size relationship of characteristic coefficients and image determination or filters.

Figure 8:
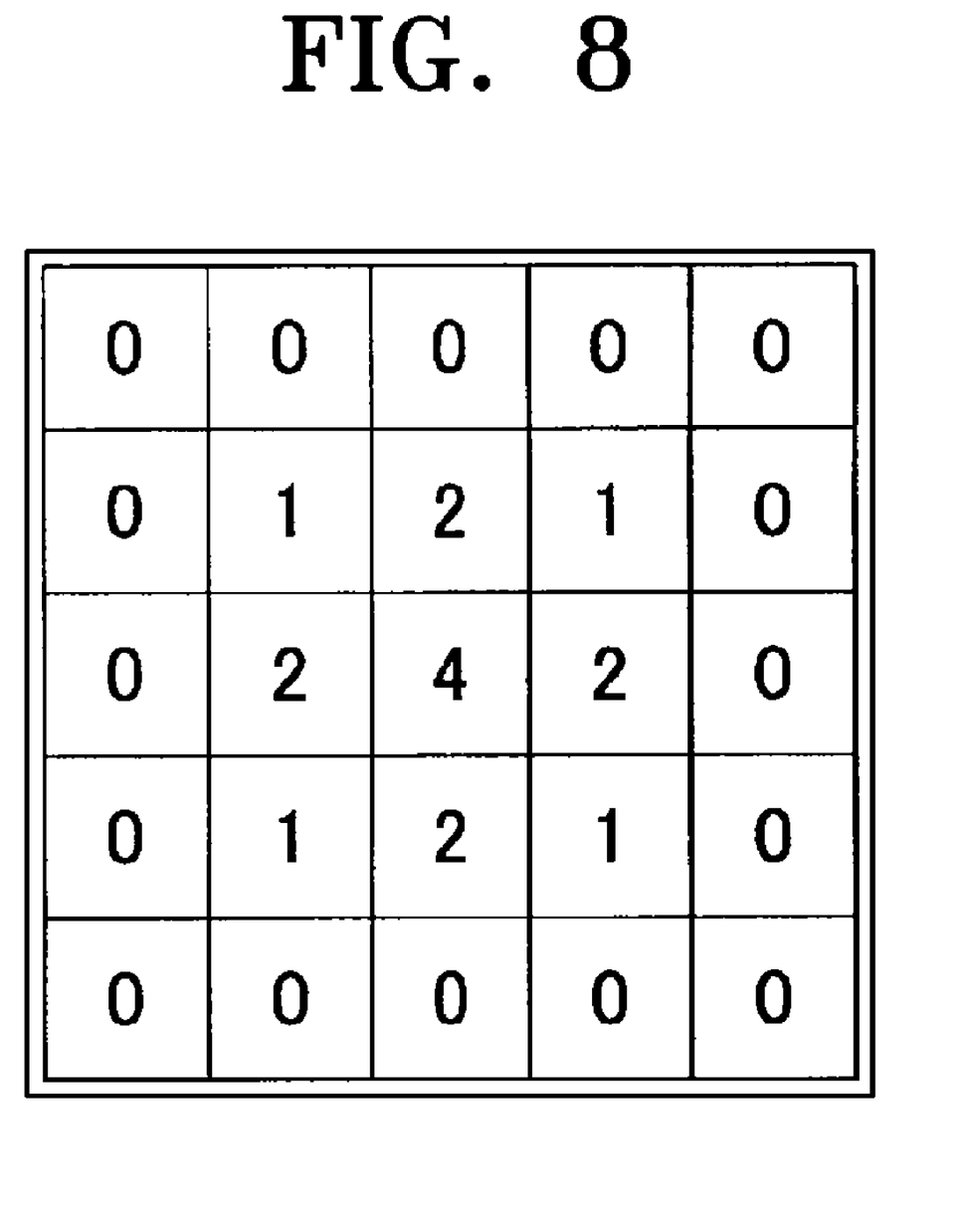
FIG. 8 is a diagram showing an example of a relatively weak LPF.

For example, if both of the characteristic coefficients k1 and k2 are less than a predetermined threshold value TH, it is determined that the target pixel corresponds to the flat portion and a relatively weak low pass filter (LPF) is selected. FIG. 8 is a diagram showing an example of a relatively weak LPF. As such, relatively weak low-pass-filtering may be performed on the target pixel corresponding to the flat portion by using the relatively weak LPF and thus noise reduction appropriate for the flat portion may be performed.

Figure 7:
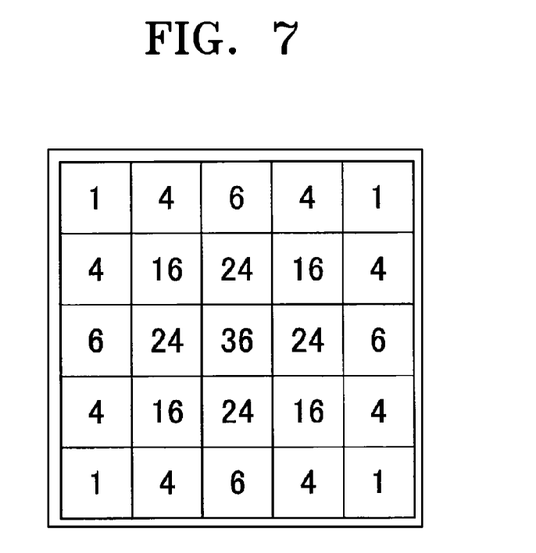
FIG. 7 is a diagram showing an example of a relatively strong low pass filter (LPF)

If the characteristic coefficient k1 is greater than the predetermined threshold value TH and the characteristic coefficient k2 is less than the predetermined threshold value TH, it is determined that the target pixel corresponds to the gradation portion and a relatively strong LPF is selected. FIG. 7 is a diagram showing an example of a relatively strong LPF. As such, relatively strong low-pass-filtering may be performed on the target pixel corresponding to the gradation portion by using the relatively strong LPF and thus noise reduction appropriate for the gradation portion may be performed If the characteristic coefficient k1 is less than the predetermined threshold value TH and the characteristic coefficient k2 is greater than the predetermined threshold value TH, it is determined that the target pixel corresponds to the frequency repetition pattern and a directional LPF is selected. The frequency repetition pattern refers to an image which includes a plurality of line shapes or in which boundaries of a plurality of line shapes extend in a predetermined direction. As such, directional low-pass-filtering may be performed on the target pixel corresponding to the frequency repetition pattern by using the directional LPF and thus noise reduction appropriate for the frequency repetition pattern may be performed.

If both of the characteristic coefficients k1 and k2 are greater than the predetermined threshold value TH, it is determined that the target pixel corresponds to the edge portion and a directional LPF is selected. The edge portion refers to an image which includes a line shape or in which the boundary of a line shape extends in a predetermined direction. As such, directional low-pass-filtering may be performed on the target pixel corresponding to the edge portion by using the directional LPF and thus noise reduction appropriate for the edge portion may be performed.

Figure 9:
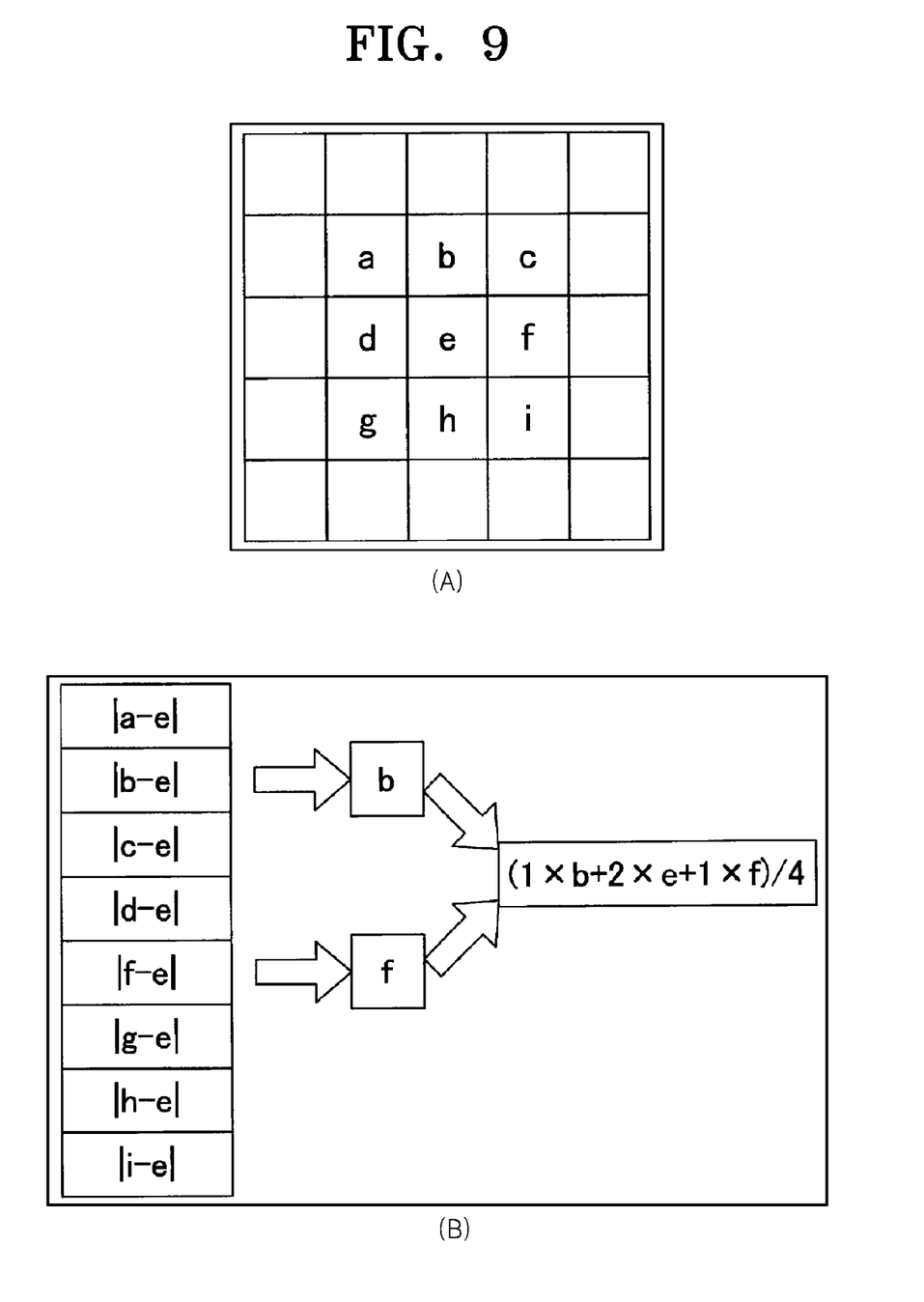
FIGS. 9A and 9B are diagrams showing examples of a directional LPF.

FIGS. 9A and 9B are diagrams showing an example of a directional LPF. As shown in FIG. 9A, initially, coefficients a through i are allocated to pixels in a block of 5×5 pixels. Referring to FIG. 9B, absolute difference values between a target pixel (e) and neighboring pixels in eight different directions are calculated as illustrated. Then, two pixels having two smallest difference values from among the calculated absolute difference values are extracted. Then, 3-tap{1,2,1} filtering is performed on a pixel value of the target pixel and pixel values of the extracted pixels.

Advantages of the noise reduction unit 130 illustrated in FIG. 2 will now be described. Conventionally, a flat portion and a gradation portion are not identifiable from each other or the gradation portion is misrecognized as the flat portion in some cases. Thus, a noise reduction strength optimized for the flat portion is insufficient for the gradation portion and a noise reduction strength optimized for the gradation portion is excessive for the flat portion.

On the other hand, in the noise reduction unit 130, a flat portion and a gradation portion are correctly recognized by using characteristic coefficients. Thus, the flat portion may be filtered with a noise reduction strength that is appropriate for the flat portion so as to prevent an excessive noise reduction strength. Also, the gradation portion may be filtered with a noise reduction strength that is appropriate for the gradation portion so as to prevent an insufficient noise reduction strength.

Also, conventionally, due to misrecognition of a gradation portion as an edge portion, noise of the gradation portion is increased. On the other hand, in the noise reduction unit 130, a gradation portion and an edge portion may be correctly recognized, the gradation portion may be filtered with a noise reduction strength appropriate for the gradation portion, and thus noise may not be increased.

Furthermore, in the noise reduction unit 130, image characteristics, other than a flat portion, an edge portion, and a gradation portion, may also be determined, appropriate filtering may be performed on an image based on the determination result, and thus correct noise reduction may be performed according to the characteristics of image data. Hence, in the embodiments of the present invention, noise included in image data may be reduced regardless of the characteristics of the image data.

Also, although it is described in the above embodiments that the noise reduction unit 130 is included in the image signal processor 144 and performs noise reduction on image data Y1 formed of a luminance signal, the present invention is not limited to this arrangement. For example, the noise reduction unit 130 may perform noise reduction on image data (RAW data) obtained by correcting pixel defects of image data output from the imaging device 110. In this case, the noise reduction unit 130 is included in the pre-processor 120.

Although it is described in the above embodiments that the characteristic coefficients k1 and k2 are calculated by using AC components A1 through A3 and B1 through B5, the present invention is not limited to this arrangement. Combinations of AC components may be arbitrarily made. For example, the characteristic coefficients k1 and k2 may be calculated by using the AC component A1 through A3 and B1 through B5, and AC components C1 through C7 and D1 through D9. Also, it is described in the above embodiments that two characteristic coefficients (k1 and k2) are calculated. However, the present invention is not limited to this arrangement and, for example, one characteristic coefficient or three characteristic coefficients may be calculated.

Although it is described in the above embodiments that image data is divided into blocks of 5×5 pixels, the present invention is not limited to this arrangement. For example, the image data may be divided into blocks of 8×8 pixels and the size of the blocks may be variously selected. Also, processing for reducing noise is not limited to filtering and different processing may be performed.

Also, although it is described in the above embodiments that a target pixel corresponds to a flat portion, a gradation portion, a frequency repetition pattern, or an edge portion, the present invention is not limited to this arrangement. For example, different characteristics such as a strong edge portion, a weak edge portion, and a shape pattern may be defined to classify the target pixel.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A noise reduction apparatus comprising:
a determinator having the capability to assign a flat portion, an edge portion, and a gradation portion to target pixels of image data, the determinator configured to determine whether a target pixel of image data corresponds to the flat portion, the edge portion, or the gradation portion based on a pixel value of the target pixel and pixel values of neighboring pixels of the target pixel; and
a noise reduction unit which reduces noise included in the image data based on a result of the determining by the determinator.

2. The apparatus of claim 1, wherein
the noise reduction unit comprises a plurality of noise reduction units,
at least one of the plurality of noise reduction units is selected based on the result of the determining by the determinator, and
the noise included in the image data is reduced by applying the selected at least one noise reduction unit to the target pixel.

3. The apparatus of claim 1, wherein the noise reduction unit comprises a low pass filter.

4. The noise reduction apparatus of claim 1, wherein the determinator further has the capability to assign a frequency repetition pattern to the target pixel of image data.

5. A noise reduction apparatus comprising:
a determinator which determines whether a target pixel of image data corresponds to a flat portion, an edge portion, or a gradation portion based on a pixel value of the target pixel and pixel values of neighboring pixels of the target pixel,
wherein the determinator calculates at least one characteristic coefficient representing characteristics of the neighboring pixels by using the pixel value of the target pixel and the pixel values of the neighboring pixels, and determines whether the target pixel corresponds to the flat portion, the edge portion, or the gradation portion based on the at least one characteristic coefficient; and
a noise reduction unit which reduces noise included in the image data based on a result of the determining by the determinator.

6. The apparatus of claim 5, wherein
the at least one characteristic coefficient is obtained by linearly combining absolute values of coefficients representing spatial frequency components of the neighboring pixels, and
the determinator determines whether the target pixel corresponds to the flat portion, the edge portion, or the gradation portion based on size relationship of a plurality of characteristic coefficients.

7. The noise reduction apparatus of claim 5, wherein
the determinator further determines whether the target pixel of image data corresponds to a frequency repetition pattern based on the pixel value of the target pixel and pixel values of neighboring pixels of the target pixel.

8. A noise reduction apparatus comprising:
a determinator which determines whether a target pixel of image data corresponds to a flat portion, an edge portion, or a gradation portion based on a pixel value of the target pixel and pixel values of neighboring pixels of the target pixel; and
a noise reduction unit which reduces noise included in the image data based on a result of the determining by the determinator,
wherein the noise reduction unit to be applied when it is determined that the target pixel corresponds to the gradation portion has a noise reduction strength greater than that of the noise reduction unit to be applied to when it is determined that the target pixel corresponds to the flat portion.

9. The noise reduction apparatus of claim 8, wherein
the determinator further determines whether the target pixel of image data corresponds to a frequency repetition pattern based on the pixel value of the target pixel and pixel values of neighboring pixels of the target pixel.

10. A noise reduction method comprising:
calculating at least one characteristic coefficient representing characteristics of neighboring pixels of a target pixel of image data by using a pixel value of the target pixel and pixel values of the neighboring pixels;
determining whether the target pixel corresponds to a flat portion, an edge portion, or a gradation portion based on the at least one characteristic coefficient; and
reducing noise included in the image data based on a result of the determining.

11. The method of claim 10, wherein the calculating calculates said at least one characteristic coefficient representing characteristics of the neighboring pixels by using the pixel value of the target pixel and the pixel values of the neighboring pixels, and determines whether the target pixel corresponds to the flat portion, the edge portion, or the gradation portion based on the at least one characteristic coefficient.

12. The method of claim 11, wherein
the at least one characteristic coefficient is obtained by linearly combining absolute values of coefficients representing spatial frequency components of the neighboring pixels, and
the determining determines whether the target pixel corresponds to the flat portion, the edge portion, or the gradation portion based on size relationship of a plurality of characteristic coefficients.

13. The method of claim 10, wherein
the noise reducing includes selecting at least one of a plurality of noise reduction units based on the result of the determining, and reducing the noise included in the image data by applying the selected at least one noise reduction unit to the target pixel.

14. The method of claim 10, wherein the noise reduction to be applied during the noise reducing, when it is determined that the target pixel corresponds to the gradation portion, has a noise reduction strength greater than that of the noise reduction to be applied to when it is determined that the target pixel corresponds to the flat portion.

15. The method of claim 10, wherein the noise reducing comprises operating a low pass filter to filter the noise.

16. A non-transitory computer-readable storage medium having recorded thereon a program for executing a noise reduction method, the method comprising:
calculating at least one characteristic coefficient representing characteristics of neighboring pixels of a target pixel of image data by using a pixel value of the target pixel and pixel values of the neighboring pixels;
determining whether the target pixel corresponds to a flat portion, an edge portion, or a gradation portion based on the at least one characteristic coefficient; and
reducing noise included in the image data based on a result of the determining.

17. The non-transitory computer-readable storage medium of claim 16, wherein the calculating calculates said at least one characteristic coefficient representing characteristics of the neighboring pixels by using the pixel value of the target pixel and the pixel values of the neighboring pixels, and determines whether the target pixel corresponds to the flat portion, the edge portion, or the gradation portion based on the at least one characteristic coefficient.

18. The non-transitory computer-readable storage medium of claim 17, wherein
the at least one characterisitic coefficient is obtained by linearly combining absolute values of coeficients representing spatial frequency components of the neighboring pixels, and
the determining determines whether the target pixel corresponds to the flat portion, the edge portion, or the gradation portion based on size relationship of a plurality of characteristic coefficients.

19. The non-transitory computer-readable storage medium of claim 16, wherein the noise reducing includes selecting at least one of a plurality of noise reduction units based on the result of the determining, and reducing the noise included in the image data by applying the selected at least one noise reduction unit to the target pixel.

20. The non-transitory computer-readable storage medium of claim 16, wherein the noise reduction to be applied during the noise reducing, when it is determined that the target pixel corresponds to the gradation portion, has a noise reduction strength greater than that of the noise reduction to be applied to when it is determined that the target pixel corresponds to the flat portion.

21. The non-transitory computer-readable storage medium of claim 16, wherein the noise reducing comprises operating a low pass filter to filter the noise.

22. The method of claim 10, further comprising:
determining whether the target pixel of image data corresponds to a frequency repetition pattern based on the at least one characteristic coefficient.

* * * * *

UNITED STATES PATENT AND TRADEMARK OFFICE
CERTIFICATE OF CORRECTION

PATENT NO.         : 8,373,775 B2
APPLICATION NO.    : 12/579548
DATED              : February 12, 2013
INVENTOR(S)        : Masayu Higuchi It is certified that error appears in the above-identified patent and that said Letters Patent is hereby corrected as shown below:

IN THE CLAIMS:

In Claim 18, Column 12, line 9, replace "characterisitic" with
-- characteristic --

In Claim 18, Column 12, line 10, replace "coeficients" with
-- coefficients --

Signed and Sealed this
Twentieth Day of August, 2013

Teresa Stanek Rea
*Acting Director of the United States Patent and Trademark Office*